J. F. MERRILL.

Construction of Fruit Cans.

No. 4,735. Reissued Feb. 6, 1872.

John F. Merrill

C. G. Hale.
O. M. Shurtz

UNITED STATES PATENT OFFICE.

JOHN F. MERRILL, OF CINCINNATI, OHIO.

IMPROVEMENT IN CONSTRUCTION OF FRUIT-CANS.

Specification forming part of Letters Patent No. 105,109, dated July 5, 1870; reissue No. 4,735, dated February 6, 1872.

I, JOHN F. MERRILL, of Cincinnati, in the county of Hamilton and State of Ohio, have invented a certain new and useful Improvement in Fruit-Cans, of which the following is a specification:

The object of this improvement is to attach external "sealing-troughs" to fruit-cans in an expeditious, secure, and economical way, which result is accomplished in the following manner: The annular plate or rim, which constitutes the "sealing-trough," is provided on its inner edge with either an upturned or down-turned flange, that is adapted to fit into a suitable circumferential groove, crease, or channel, which is formed in the body of the can, and when the latter has been expanded by any suitable implement, so as to cause its crease to hug the inner flange of the rim, and the body of the can soldered, said sealing-trough is immovably secured in position.

Figure 1:
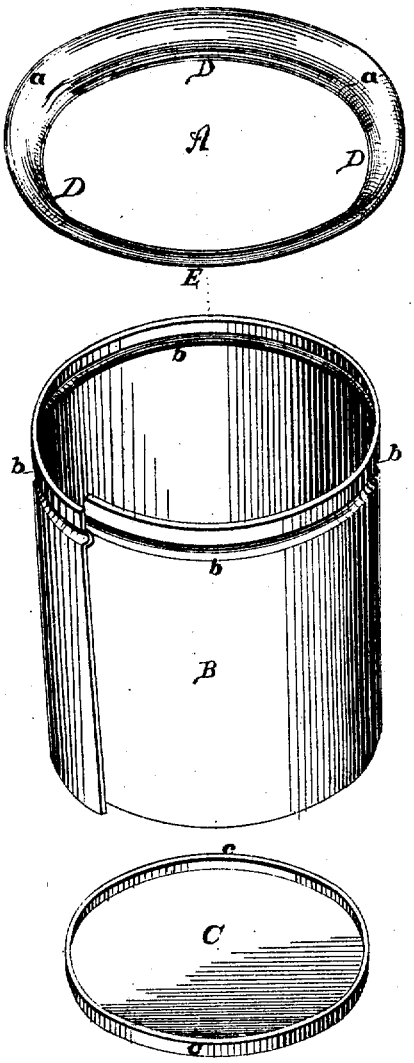
Figure 2:
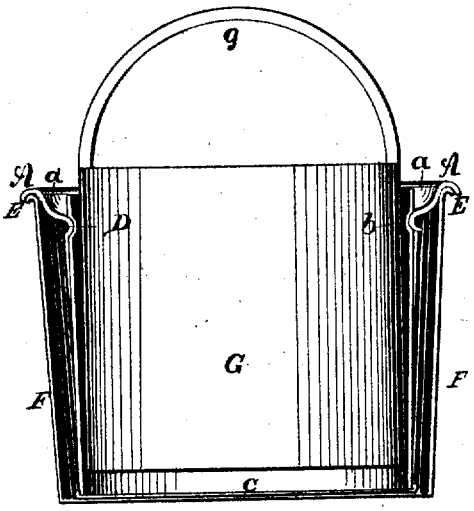
Figure 3:
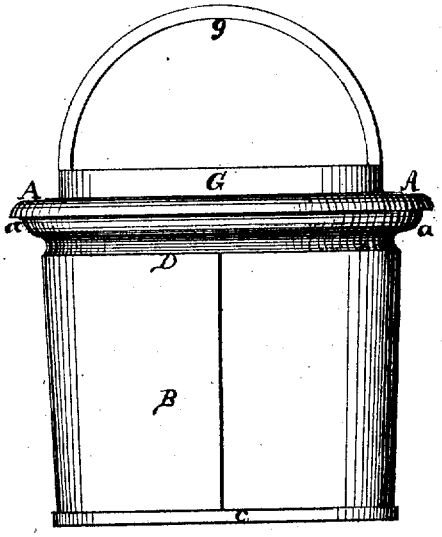
Figure 4:
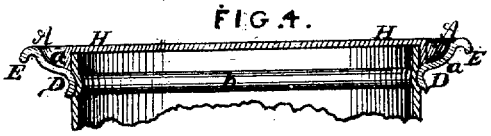

Figure 1 is a perspective view of the rim, the unsoldered body of the can, and the bottom of the same, these three different members being detached. Fig. 2 is an axial section, showing the manner of applying the rim and bottom of the can to the body, and also the implement by which the latter is expanded, so as to cause its crease to hug the flange of the sealing-trough. Fig. 3 is a side elevation, showing the expanding implement fitted within the can, and the latter in condition of soldering. Fig. 4 is an enlarged sectional view through the upper part of my fruit-can.

A, B, and C represent, respectively, the rim, the body, and the bottom of a fruit-can embodying my improvements, the bottom having the customary upturned marginal flange *c*, and the sides of the can being either parallel or converging toward their lower ends, the latter form being preferred. The rim A is composed of a single annular piece of sheet metal, which is "struck up" in such a manner as to have a depressed portion, *a*, which constitutes the sealing-trough proper, and an inner flange, D, which can project either up or down, as may be found convenient. The outer circumference is stiffened by a swell, E. The body of the can has turned in it, near its upper end, a groove or recess, or channel, *b*, whose depressed portion is presented toward the outside of the can.

In order that the rim and bottom may be united to the body of the can in a secure, uniform, and expeditious manner, and with the least expense, I adopt the following mode of construction: I provide a stand, F, which is open at top, and suitably supported, and whose length is equal to the desired height of the sealing-trough. I then drop into this open-mouthed stand the bottom C *c* of the can, after which I apply the rim A in such a manner that its outer swell E will rest upon the upper end of said stand. The unsoldered sheet of metal B, which is to compose the body of the can, after being properly "formed," is then inserted within the rim A and the flange *c* of the bottom. I then force down within the body of the can a tapering plug or plunger, G, which expands the piece of sheet metal B. This insertion of the plunger G forces out the bottom of the can against the flange *c*, and also expands the upper part of the can in such a manner as to cause its crease *b* to hug very tightly the inner flange D of the rim A. In this expanded condition of the can, it, with the adhering bottom and rim, is lifted bodily from the stand, and the sides of the can and bottom soldered. The rim thus attached may be soldered to the body if preferred, although it is not necessary. After soldering the sides and bottom of the can, the tapering plug G is easily withdrawn by the aid of its handle *g*.

In manufacturing small cans a wooden plug may be employed; but for large cans, where the weight of the wooden plug might be objectionable, a sheet-metal one can be substituted therefor.

By referring to Fig. 4 it will be seen that, after the cap or cover H is applied, a sufficient trough is formed between its sides and depressed portion *a* of the rim to contain the sealing-wax or other cement.

This mode of construction insures the rim being attached to the body at the proper position, and there can be no possibility of the rim being secured too near or too remote from the upper end of the can.

I claim as my invention—

1. The body B, having the circumferential crease *b*, in combination with a corresponding curvature in the rim A, constructed substantially as described, for the purpose set forth.

2. The open-mouthed stand, when used in combination with the rim of the can, in the process of manufacture, substantially as described.

3. The stand, when used in combination with the plunger in the formation of the body and trough of a fruit-can, substantially as set forth.

JOHN F. MERRILL.

Witnesses:
C. G. HALE,
P. M. SHUEY.